Sept. 4, 1956   C. D. HETZLER   2,762,037
SIGNAL
Filed Aug. 31, 1954

Chalmer D. Hetzler
INVENTOR.

BY
Attorneys

United States Patent Office 2,762,037
Patented Sept. 4, 1956

2,762,037
SIGNAL

Chalmer D. Hetzler, Dayton, Ohio

Application August 31, 1954, Serial No. 453,261

1 Claim. (Cl. 340—321)

This invention relates generally to signals, and more specifically to signals with illuminating means therein for illuminating indicia thereon for accentuating the signal.

An object of this invention is to provide a signal for positioning on a vehicle that is especially designed for use in locating a vehicle in a darkened drive-in theater or other areas, such as parking lots or the like.

Another object of the present invention is to provide a signal having means for supporting the signal from a rear view mirror of a vehicle substantially in the central portion of a windshield wherein the signal may be observed from the front of a car, thereby enabling a person to identify his car in a darkened area, such as a drive-in theater or the like.

Still another important object of this invention is to provide a signal for use in conjunction with a vehicle wherein the signal may be provided with the vehicle owner's initials thereby providing an easily identifiable signal for locating a vehicle in darkened areas, such as parking lots, drive-in theaters or the like.

Other important objects of the present invention reside in its simplicity of construction, its ease of attachment and operation, its adaptability for its specific use, and its inexpensive manufacture.

Figure 1:
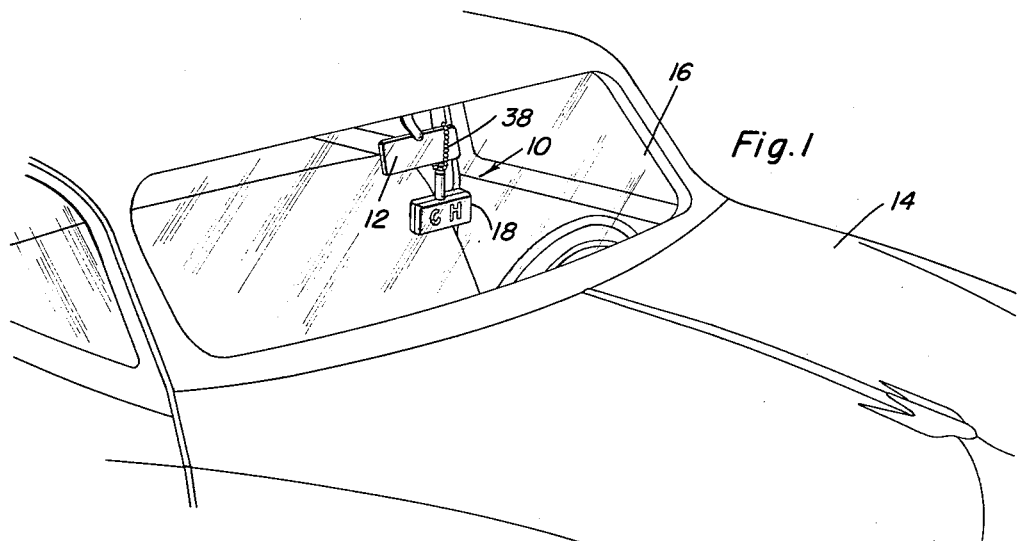
Figure 2:
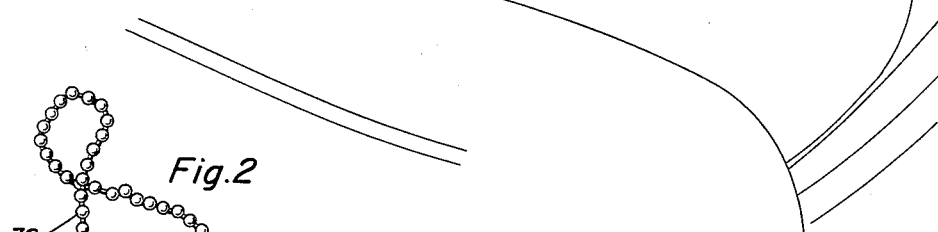
Figure 3:
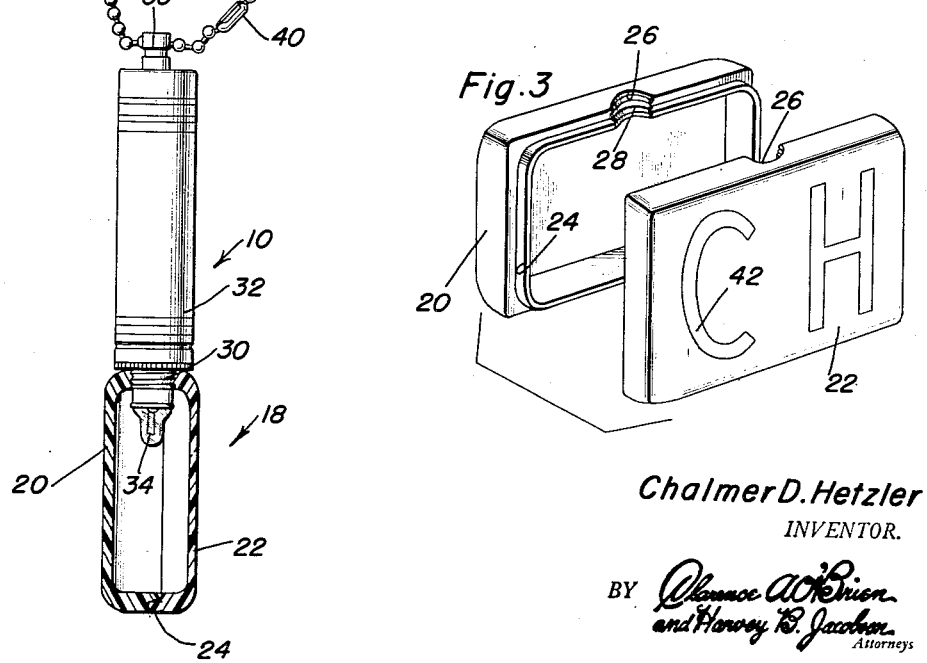

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the signal of the present invention attached to the rear view mirror directly behind the windshield of a passenger automobile;

Figure 2 is a vertical sectional view taken through the hollow housing of the present invention showing the relationship between the housing and the illuminating flashlight together with the supporting chain; and Figure 3 is a group perspective view showing the two portions of the hollow housing in separated conditon wherein the relationship of the indicia thereon to the remainder of the signal is shown.

Referring now specifically to the drawings, the numeral 10 generally designates the signal of the present invention for attachment to the rear view mirror 12 of an automobile 14 directly behind the windshield 16.

The signal 10 generally includes a housing designated by the numeral 18 comprised of two sections 20 and 22 joined together along a juncture line 24. Each of the sections 20 and 22 is provided with a semicircular recess 26 which forms an opening on the upper side of the housing 18 when the sections 20 and 22 are poined together in permanent relation. The opening formed by the semicircular recesses 26 are provided with screw threads 28 for receiving a screw threaded projection 30 on a flashlight 32. The flashlight bulb 34 is also inserted in the interior of the screw threaded projection 30, thereby providing a light on the interior of the hollow housing 18.

The flashlight 32 is provided with an actuating switch 36 in one end thereof wherein a flexible chain 38 is inserted through an aperture therein and the ends of the chain 38 are joined together by a fastener 40. The switch actuating device 36 on the flashlight 32 may be moved to an "on" position and it will stay in this position until such time as it is manually moved to an "off" position. The details of the flashlight are not illustrated, as the type of flashlight 32 used may be of any type having a manual "on" and "off" switch. One section 22 of the housing 18 is provided with indicia 42 which may be the initials of the owner of the vehicle, wherein the light bulb 34 will illuminate the initials 42. The casing 18 may be constructed of opaque material except that area in the section 22 that forms the indicia 42, thereby providing illuminated initials when the illuminating means 34 is illuminated.

In operation, the chain 38 is positioned over the edge of the rear view mirror 12 with the initials 42 facing the windshield 16. The light bulb 34 is turned on by manual actuation of the switch 36 and a person then may leave his vehicle in a drive-in theater at night and go to the usual refreshment stand or move about as desired and then easily locate his vehicle in the dark by identifying the initials or indicia 42. Inasmuch as the housing 18 is constructed of opaque or at least translucent material, the light therein will not be sufficient to annoy persons in adjacent vehicles that are watching the movie at the drive-in theater. The housing 18 may be constructed of plastic or other suitable materials, and any significant indicia may be used in order to designate and easily identify a particular vehicle. Further, the light may be utilized in other darkened areas having a plurality of automobiles therein, such as a parking lot or the like. Also, while the supporting means is generally shown as a flexible chain, other means may be provided for securing the signal 10 onto the mirror 12 and especially so in the modern type automobiles wherein the mirror is suspended below the upper edge of the windshield, thereby permitting the signal 10 to be positioned directly on the rear surface of the mirror 12, thereby enabling the signal 10 to be retained on the mirror during normal operation of the vehicle 14.

From the foregoing, the construction and operation of the device will be readily understood, and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A signal for positioning on vehicle mirrors comprising a hollow housing having a threaded opening in one wall thereof, indicia on said housing, illuminating means positioned in said housing and attached to said opening, and means for supporting the housing from a vehicle mirror for viewing through the windshield wherein a vehicle may be identified when the indicia is illuminated by said illuminating means, said illuminating means including a flashlight having a socket whose outer surface is in screw threaded engagement with said threaded opening in the housing with the light bulb secured in said socket and positioned in the housing for illuminating the indicia.

References Cited in the file of this patent

UNITED STATES PATENTS

| | | |
|---|---|---|
| 1,236,647 | Alt | Aug. 14, 1917 |
| 1,285,669 | French | Nov. 26, 1918 |
| 2,060,401 | Smith | Nov. 10, 1936 |